US012763506B2

(12) United States Patent
Neumann et al.

(10) Patent No.: US 12,763,506 B2
(45) Date of Patent: Oct. 13, 2026

(54) PLUG-IN CONNECTOR ASSEMBLY

(71) Applicant: Stäubli Electrical Connectors AG, Allschwil (CH)

(72) Inventors: Dimitri Neumann, Herne (DE); Thomas Kluttig, Duisburg (DE); Philipp Alexander Strehler, Basel (CH)

(73) Assignee: Staubli Electrical Connectors AG, Allschwil (CH)

( * ) Notice: Subject to any disclaimer, the term of this patent is extended or adjusted under 35 U.S.C. 154(b) by 303 days.

(21) Appl. No.: 18/568,500

(22) PCT Filed: Jun. 15, 2022

(86) PCT No.: PCT/EP2022/066407
§ 371 (c)(1),
(2) Date: Dec. 8, 2023

(87) PCT Pub. No.: WO2023/274737
PCT Pub. Date: Jan. 5, 2023

(65) Prior Publication Data
US 2024/0275100 A1 Aug. 15, 2024

(30) Foreign Application Priority Data
Jun. 30, 2021 (EP) .................................... 21182773

(51) Int. Cl.
*H01R 13/17* (2006.01)
*H01R 13/187* (2006.01)

(52) U.S. Cl.
CPC ........... *H01R 13/17* (2013.01); *H01R 13/187* (2013.01)

(58) Field of Classification Search
CPC ...... H01R 13/17; H01R 13/187; H01R 13/44; H01R 43/20
(Continued)

(56) References Cited

U.S. PATENT DOCUMENTS 10,224,659 B2 * 3/2019 Pemwieser .............. H01R 4/48
11,146,001 B2 * 10/2021 Endo ...................... H01R 43/16
(Continued)

FOREIGN PATENT DOCUMENTS

KR 10-2009-0005334 A 1/2009

OTHER PUBLICATIONS

International Search Report for PCT/EP2022/066407 dated Sep. 9, 2022.

*Primary Examiner* — Tulsidas C Patel
*Assistant Examiner* — Carlos E Lopez-Pagan
(74) *Attorney, Agent, or Firm* — Sughrue Mion, PLLC

(57) ABSTRACT

A plug-in connector assembly has a first plug-in connector element having at least one first contact face, a second plug-in connector element having at least one second contact face, and a contact element for establishing electrical contact between the first plug-in connector element and the second plug-in connector element. The first plug-in connector element and the second plug-in connector element can be connected to one another from an unplugged state into a plugged state in the direction of a plug-in axis. The contact element has at least one contact strip, which extends around the centre axis, with a contact strip-side contact face and has a plurality of contact lugs, which extend away from the contact strip in the direction of the centre axis.

16 Claims, 9 Drawing Sheets

(58) Field of Classification Search
USPC .......................................................... 439/131
See application file for complete search history.

(56) References Cited

U.S. PATENT DOCUMENTS

| | | | | |
|---|---|---|---|---|
| 11,168,722 | B2 * | 11/2021 | Erpenbeck | F16B 41/002 |
| 2012/0088381 | A1 * | 4/2012 | Wild | H01R 24/566<br>439/131 |
| 2017/0324181 | A1 * | 11/2017 | Chevreau | H01R 43/16 |

* cited by examiner

PLUG-IN CONNECTOR ASSEMBLY

CROSS REFERENCE TO RELATED APPLICATIONS

This application is a National Stage of International Application No. PCT/EP2022/066407 filed Jun. 15, 2022, claiming priority based on European Patent Application Ser. No. 21/182,773.8 filed Jun. 30, 2021.

TECHNICAL FIELD

The present invention relates to a plug-in connector assembly according to claim 1.

PRIOR ART

Plug-in connections between a socket element and a plug element have become known from the prior art. In order to establish electrical contact between the socket element and the plug element, spring-loaded contact elements are usually used, which are mounted either on the outside of the plug element or on the inside of the socket element.

Document KR 2009 0005334 discloses one of said plug-in connectors. According to KR 2009 0005334, a contact element is held by tabs in a recess on the plug element. For the electrical contact between the contact element and the socket element or the plug element, the mechanical contact between the contact element and the socket element or the plug element is important. A disadvantage of KR 2009 0005334 is that there are no determinate contact points between the contact element and the recess. This leads to disadvantages in the establishment of electrical contact. For example, the contact element can become very hot.

SUMMARY OF THE INVENTION

Starting from this prior art, the object of the invention is to provide a plug-in connector assembly which overcomes the disadvantages of the prior art. In particular, it is a preferred object of the present invention to provide a plug-in connector assembly which permits improved electrical contacting between a first plug-in connector element and a second plug-in connector element.

This object is achieved by the subject matter of claim 1. Accordingly, a plug-in connector assembly comprises a first plug-in connector element with at least one first contact face, a second plug-in connector element with at least one second contact face, and a contact element for establishing an electrical contact between the first plug-in connector element and the second plug-in connector element. The first plug-in connector element and the second plug-in connector element are connectable to each other in the direction of a plug-in axis from an unplugged state to a plugged state. In the plugged state, the contact element is located between the first contact face and the second contact face and establishes the electrical contact between the two plug-in connector elements. The contact element has at least one contact strip extending around the center axis and having a contact-strip-side contact face, and a plurality of contact tabs extending away from the contact strip in the direction of the center axis and having contact-tab-side contact faces. The at least one contact strip is contactable with the contact-strip-side contact face in contact with the first contact face, and the contact tabs are contactable with the contact-tab-side contact faces in contact with the second contact face. The contact-strip-side contact face and the first contact face are designed in such a way that, in the unplugged state, the contact-strip-side contact face and the first contact face run angularly inclined at an angle $\alpha$ relative to each other over a region in cross section viewed through the center axis, and that, in the plugged state, the contact-strip-side contact face and the first contact face can be brought into planar contact with each other in said region or in that, in the plugged state, the contact-strip-side contact face and the first contact face can be brought into planar contact with each other in at least one sub-region of said region.

During the plugging process, the contact tabs are elastically deformed. This means that the contact tabs move radially relative to the center axis and are elastically deformed in the process. Since the contact tabs stand away from the contact strip, the contact strip is also elastically deformed during the elastic deformation of the contact tabs. The elastic deformation moves the contact-strip-side contact face towards the first contact face and brings it into said planar contact with the first contact face.

The expression “planar contact” is understood to mean that the contact-strip-side contact face and the first contact face are in planar contact with each other. In the case of planar contact, the angular inclination between the two contact faces is no longer present, but the two contact faces then extend parallel to each other, wherein the two contact faces are then in said planar contact with each other. In this way, the contact area essential for the electrical contact can be increased.

In the plugged state, the at least one contact strip and the contact face are in contact over a larger area than in the unplugged state.

The planar contact has the particular advantage that an improved contact resistance can be created between the contact element and the first plug part. The heat generation can therefore be minimized at high currents.

The planar bearing contact has the further advantage that the electrical contact between the first plug part and the contact element can be established in a process-reliable way.

Preferably, the first contact face has a length, as viewed in the direction of the center axis, that is substantially at least equal to the length of the contact strip, as viewed in the direction of the center axis.

In a first embodiment, said region in which the said contact faces run angularly inclined relative to each other in the unplugged state forms a first region, wherein the first region is adjoined by a second region in which the contact-strip-side contact face and the first contact face are in planar contact with each other in the unplugged state.

An edge surrounding the center axis is formed between the first region and the second region, wherein the contact-strip-side contact face extends over the edge as seen in the direction of the center axis. Due to the bearing in the unplugged state via the planar contact, the advantage of a certain bearing between the contact element and the first plug-in connector element is obtained.

Preferably, in the plugged state, the contact-strip-side contact face in the second region is raised from the first contact face.

The second region has the advantage that the receiving groove is easier to manufacture.

Preferably, the length of the first region, viewed in the direction of the center axis, is many times greater than the length of the second region. The second region can be very short compared to the first region. This has the advantage that the area of the contact between the contact-strip-side contact face and the first contact face is many times larger in the plugged state than in the unplugged state.

In a second embodiment, said region in which said contact faces are angularly inclined with respect to each other in the unplugged state extends over the entire length of the contact strip or over part of the length of the contact strip, as viewed in the direction of the center axis.

Preferably, the first plug-in connector element has a receiving groove for receiving the contact element, wherein the receiving groove is delimited by two spaced-apart stop faces. Said region in which said contact faces run angularly inclined relative to each other in the unplugged state is located in the region of the stop faces, i.e. spatially close.

Particularly preferably, in the above-mentioned first embodiment, the second region directly and immediately adjoins the stop face and the first region directly and immediately adjoins the second region.

Particularly preferably, in the above-mentioned second embodiment, the first contact face directly and immediately adjoins the stop face.

Preferably, the receiving groove in the region in which the contact tabs lie has a smaller diameter than in the region in which the contact strip lies. The dimension of the smaller diameter results substantially from the above-mentioned angle.

In a first variant, in said region in which said contact faces run angularly inclined relative to each other in the unplugged state, the contact-strip-side contact face is circular-cylindrical in the unplugged state, and the first contact face for providing the angular progression has a cone region.

In a second variant, in said region in which said contact faces run angularly inclined relative to each other in the unplugged state, the first contact face is circular-cylindrical and the contact-strip-side contact face has a cone region in the unplugged state for providing the angular progression.

Preferably, seen in cross-section through the center axis, said angle $\alpha$ is between 0.5° and 5° in the unplugged state, in particular between 0.9° and 3°.

Preferably, the contact element has exactly two spaced-apart contact strips, wherein the contact tabs extend from one contact strip to the other contact strip. This means that there are also two contact-strip-side contact faces and two first contact faces. With regard to the receiving groove, this further means that each stop face is adjoined by a first contact face or a first region.

Preferably, the contact tabs extend radially outwards or radially inwards in cross-section as viewed transversely to the center axis with respect to the contact strip. If the first plug-in connector element is a plug pin, the contact tabs extend radially outwards. If the first plug-in connector element is a socket, the contact tabs extend radially inwards.

Preferably, the second contact face is circular-cylindrical, in particular with a constant diameter.

Preferably, the first plug-in connector element is a plug pin and the second plug-in connector element is a socket. The contact element rests on the plug pin and the contact tabs extend outwards away from the plug pin as seen in the radial direction relative to the center axis. The receiving groove extends radially inwards from the outside of the plug pin.

Alternatively, the first plug-in connector element is a socket and the second plug-in connector element is a plug pin. The contact element lies in the socket and the contact tabs extend away inwards from the side face of the socket as viewed in a radial direction relative to the center axis. The receiving groove extends here radially outwards from the outside of the socket.

The contact element is formed of an electrically conductive material. Preferably, the contact element is formed of a resilient copper alloy, such as copper-beryllium, copper-nickel-silicon. Preferably, the plug-in connector elements are made of copper or copper alloys. The surfaces of the plug-in connector elements and/or the contact element may be provided with an electrically conductive coating. Examples include a silver-plated, a tin-plated, a nickel-plated or a gold-plated coating.

The diameter of the first plug-in connector element and of the second plug-in connector element can be arbitrary. Likewise, the electrotechnical application can be arbitrary. For an application in the technical field of electrical measurement technology, the diameters are preferably in the range of 0.5 to 20 millimeters. The transmitted currents are in the range of 0.1 to 100 amperes.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
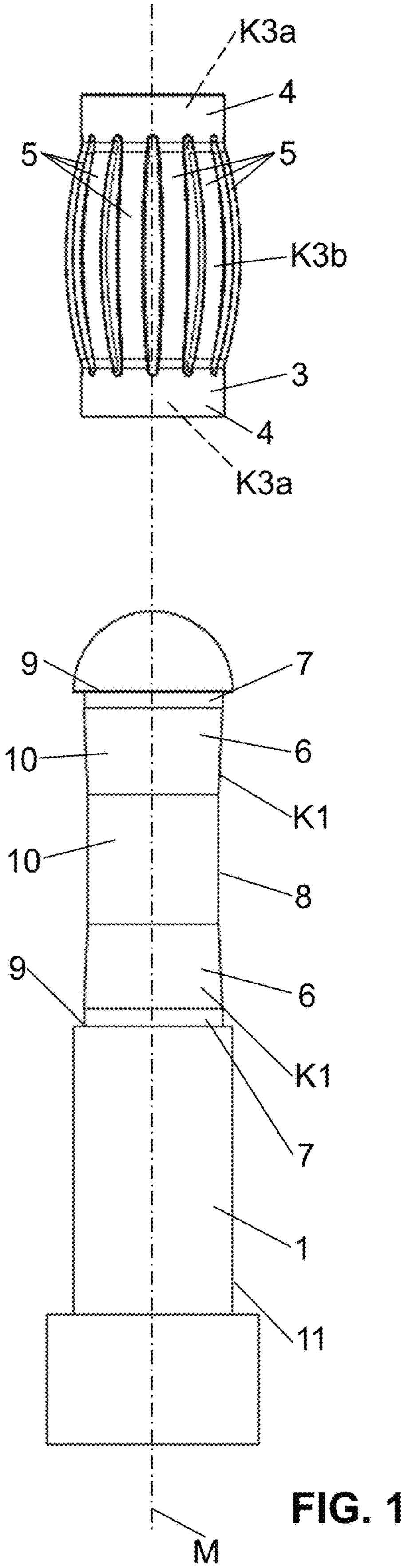
FIG. 1 shows a lateral exploded view of a plug pin of a plug-in connector assembly according to the invention according to a first embodiment.
Figure 2:
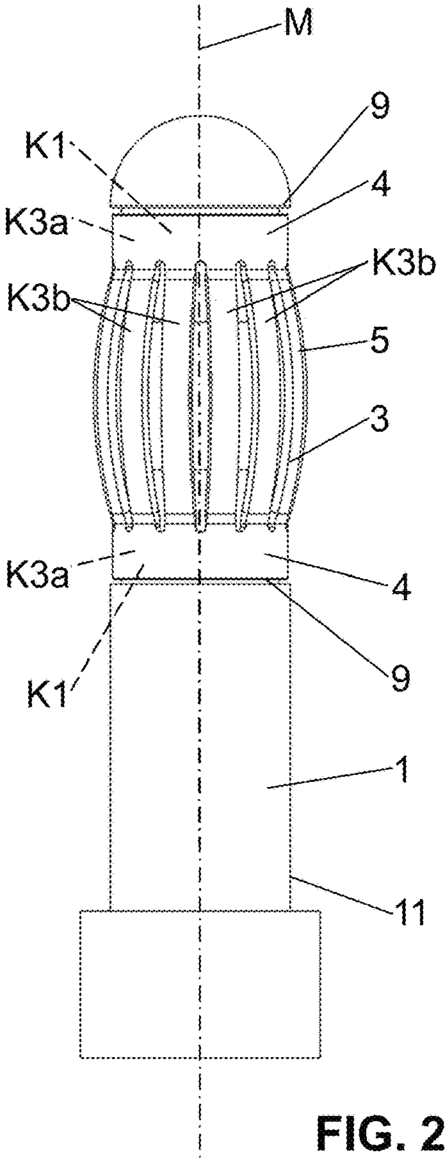
FIG. 2 shows the plug pin according to FIG. 1 in the connected state.
Figure 3:
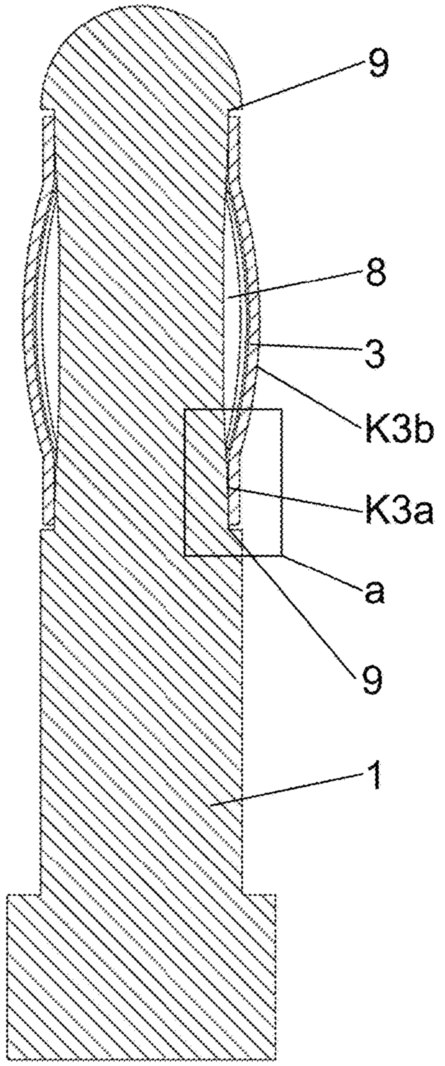
FIG. 3 shows a sectional view of FIG. 2.

FIGS. 1 to 6 show a first embodiment of a plug-in connector assembly according to the invention. FIGS. 7 to 12 show a second embodiment of a plug-in connector assembly according to the invention. The first embodiment differs from the second embodiment with respect to the length of a contact element. The basic structure between the first embodiment and the second embodiment is substantially the same and like parts are labeled with like reference signs. FIGS. 13 to 17 then show a further embodiment of a plug-in connector assembly according to the invention.

The plug-in connector assembly according to the embodiments shown comprises a first plug-in connector element 1, a second plug-in connector element 2, and a contact element 3. The contact element 3 can be used to establish or produce an electrical contact between the first plug-in connector element 1 and the second plug-in connector element 2.

In the embodiments shown according to FIGS. 1 to 12, the first plug-in connector element 1 is designed as a plug pin and has at least one first contact face K1. In the embodiments shown according to FIGS. 1 to 12, the second plug-in connector element 2 is designed as a socket and has a second contact face K2. In the embodiment according to FIGS. 13 to 17, the first plug-in connector element 1 is designed as a socket and has at least one first contact face K1. The second plug-in connector element 2 is designed as a plug pin and has a second contact face K2. When the first plug-in connector element 1 is in contact with the second plug-in connector element 2, the contact element 3 comes into contact in each case with the two contact faces K1, K2, as described further below.

The first plug-in connector element 1 and the second plug-in connector element 2 can be connected to each other in the direction of a plug-in axis S from an unplugged state to a plugged state. In FIG. 1 to 4 or 7 to 10 or 13 to 15, the unplugged state is shown in each case, and in FIGS. 5 and 6 or 11 and 12 or 16 and 17, the plugged state is shown in each case.

The contact element 3 comprises at least one contact strip 4 extending around a center axis M with a contact face K3*a* on the contact strip side and a plurality of contact tabs 5 extending away from the contact strip 4 in the direction of the center axis M with contact-tab-side contact faces K3*b*. In the embodiment shown, two contact strips 4 are spaced apart. The contact tabs 5 extend from one of the contact strips 4 to the other of the contact strips 4. The contact tabs 5 are designed as elastically resilient tabs and can be deflected radially with respect to the center axis M. Seen in cross-section, the contact tabs 5 are convexly rounded outwards according to the embodiments of FIGS. 1 to 12 and concavely rounded inwards according to the embodiments of FIGS. 13 to 17.

In the figures, it is shown that the at least one contact strip 4 with the contact-strip-side contact face K3*a* is in contact with the first contact face K1 and that the contact tabs 5 with the contact-tab-side contact faces K3*b* can be brought into contact with the second contact face K2. In the shown embodiment according to FIGS. 1 to 12, the contact element 3 is mounted on the outside of the first plug-in connector element 1 and is thus in electrical contact with the first plug-in connector element 1. In the shown embodiment according to FIGS. 13 to 17, the contact element 3 is mounted on the inside of the first plug-in connector element 1 and is thus in electrical contact with the first plug-in connector element 1. During the contact process, the contact-tab-side contact faces K3*b* come into contact with the second contact face K2 of the second plug-in connector element 2.

The contact-strip-side contact face K3*a* and the first contact face K1 are formed in such a way that, in the unplugged state, the contact-strip-side contact face K3*a* and the first contact face K1 run angularly inclined at an angle α relative to each other over a region 6 seen in cross section through the center axis, and that, in the plugged state, the contact-strip-side contact face K3*a* and the first contact face K1 can be brought into planar contact with each other in said region 6 or in a sub-region of said region 6.

Figure 4:
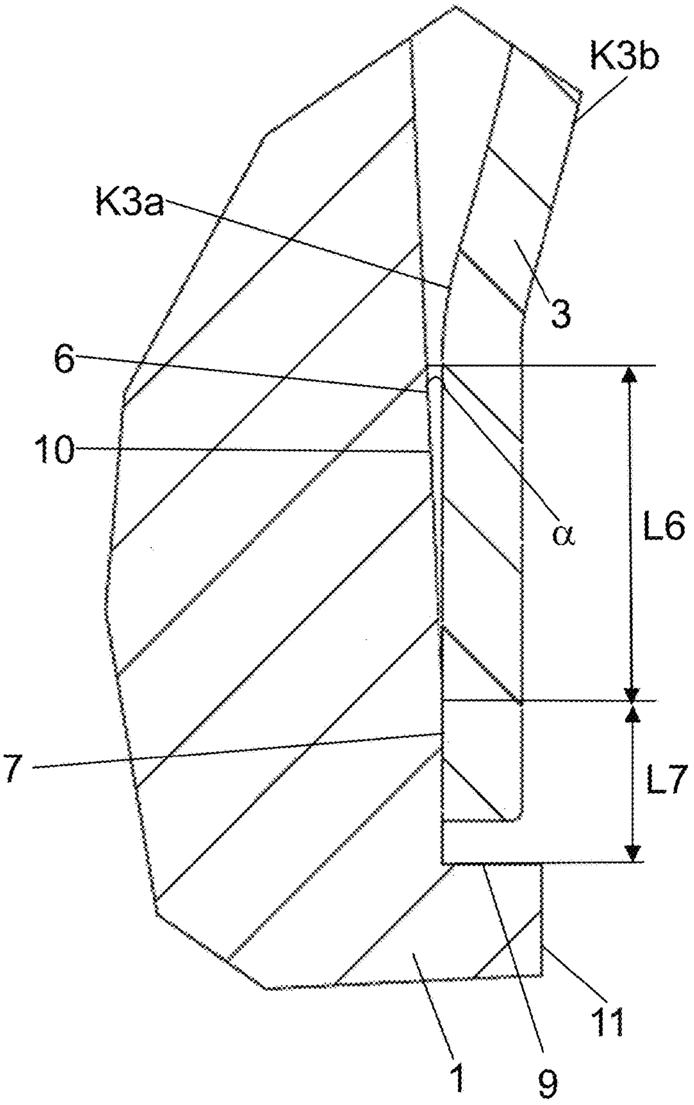
FIG. 4 shows a detailed view of detail a of FIG. 3.
Figure 5:
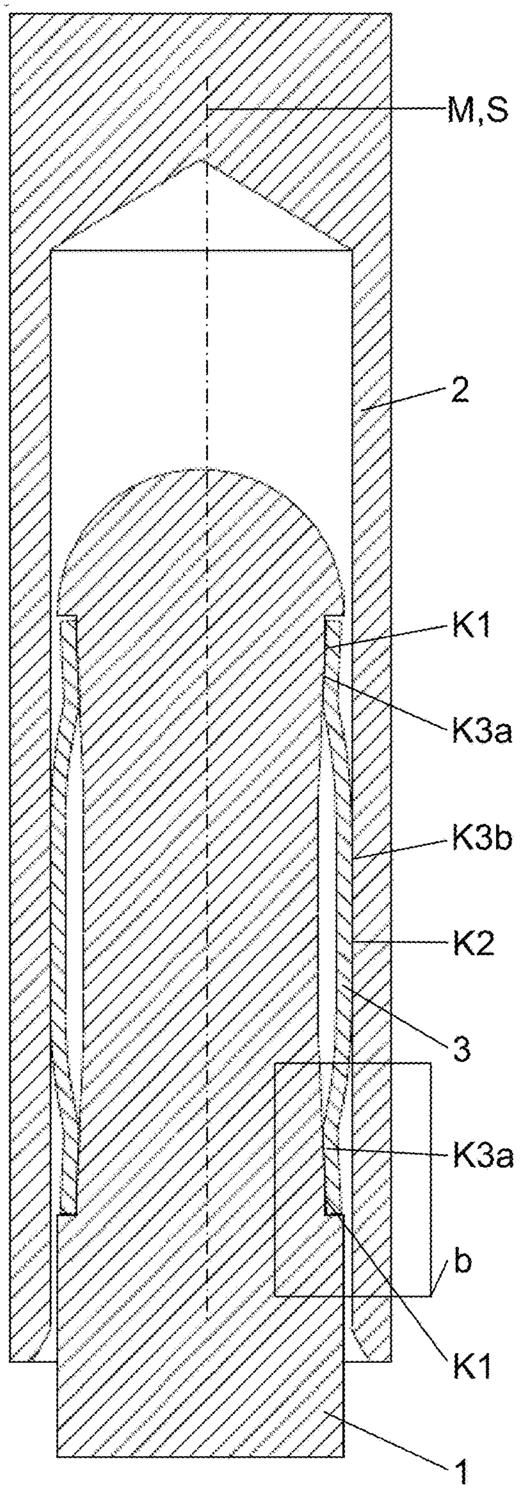
FIG. 5 shows a sectional view of the plug pin according to FIGS. 1 to 4 in the contacted state with a socket.
Figure 10:
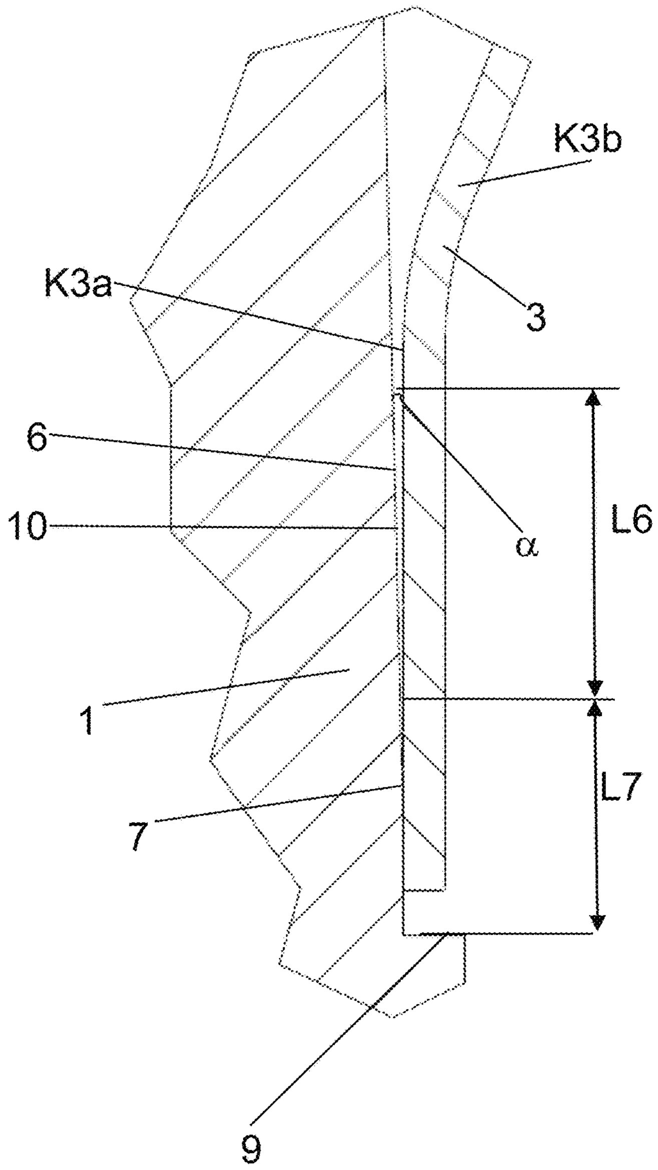
FIG. 10 shows a detailed view of detail c of FIG. 9.
Figure 11:
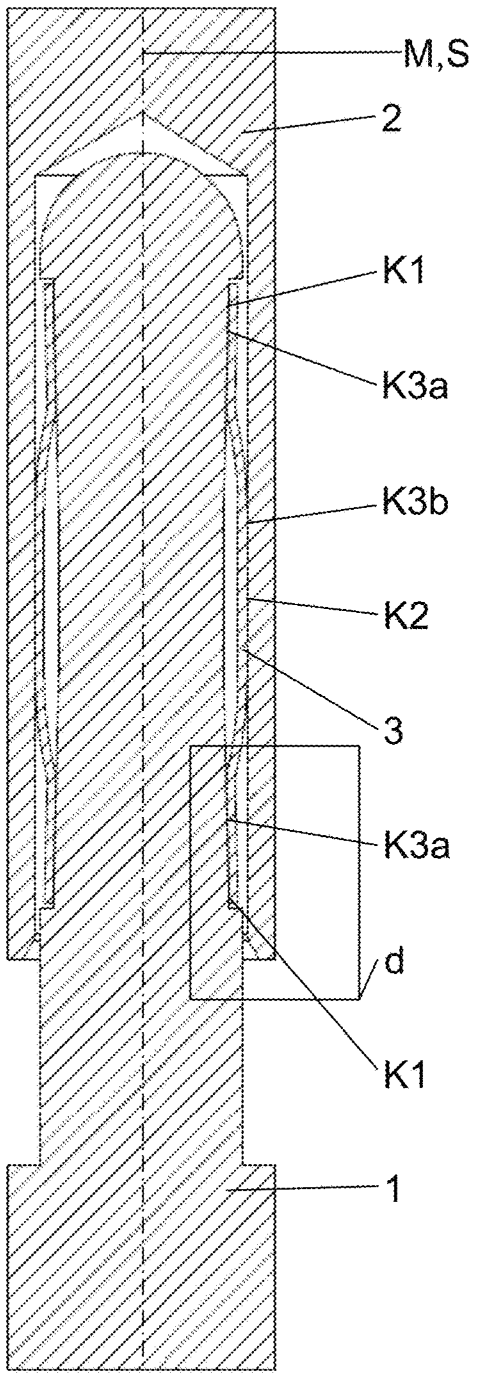
FIG. 11 shows a sectional view of the plug pin according to FIGS. 7 to 10 in the contacted state with a socket.
Figure 15:
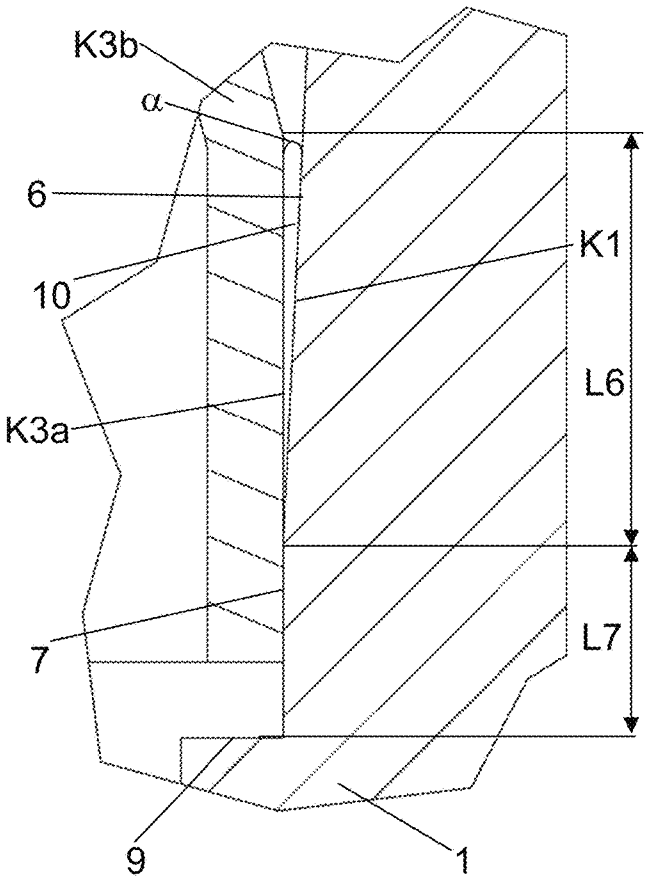
FIG. 15 shows a detailed view of detail e of FIG. 14.
Figure 16:
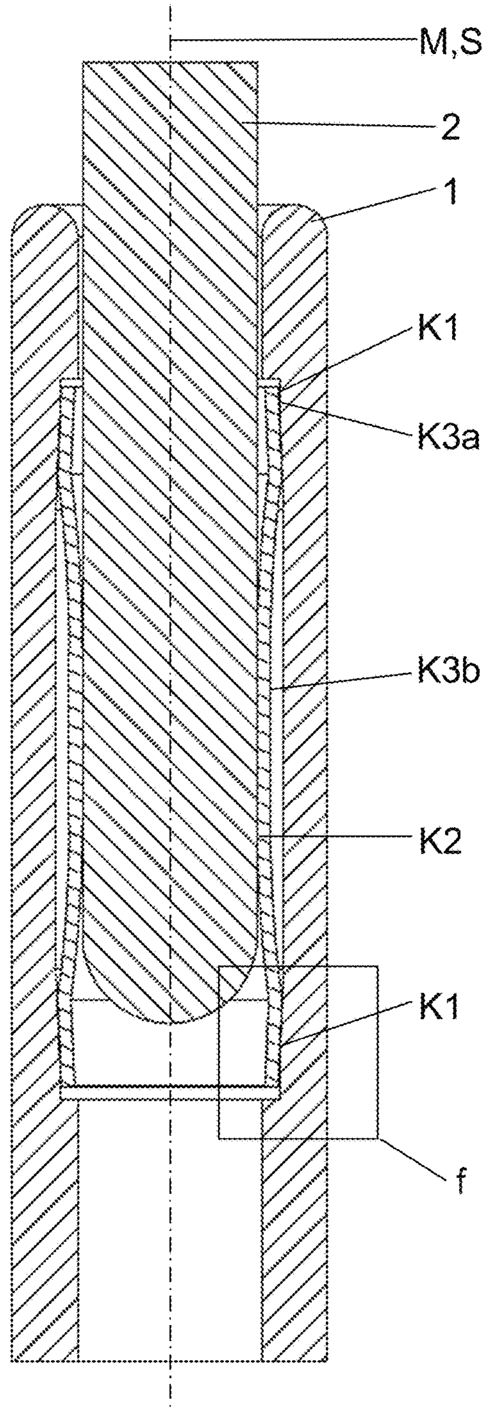
FIG. 16 shows a sectional view of the socket according to FIGS. 13 to 15 in the contacted state with a plug pin.

In FIGS. 3 and 4 or 9 and 10 or 14 and 15, it can be clearly seen how the contact-strip-side contact face K3*a* and the first contact face K1 run angularly inclined at said angle α relative to each other. FIGS. 4, 10 and 15 show the details a, c and e of FIGS. 3, 9 and 14, respectively. The angle α is evident when viewed in cross-section through the center axis M. In the region of the angle α there is a gap between the contact-strip-side contact face K3*a* and the first contact face K1 in the unplugged state.

Figure 6:
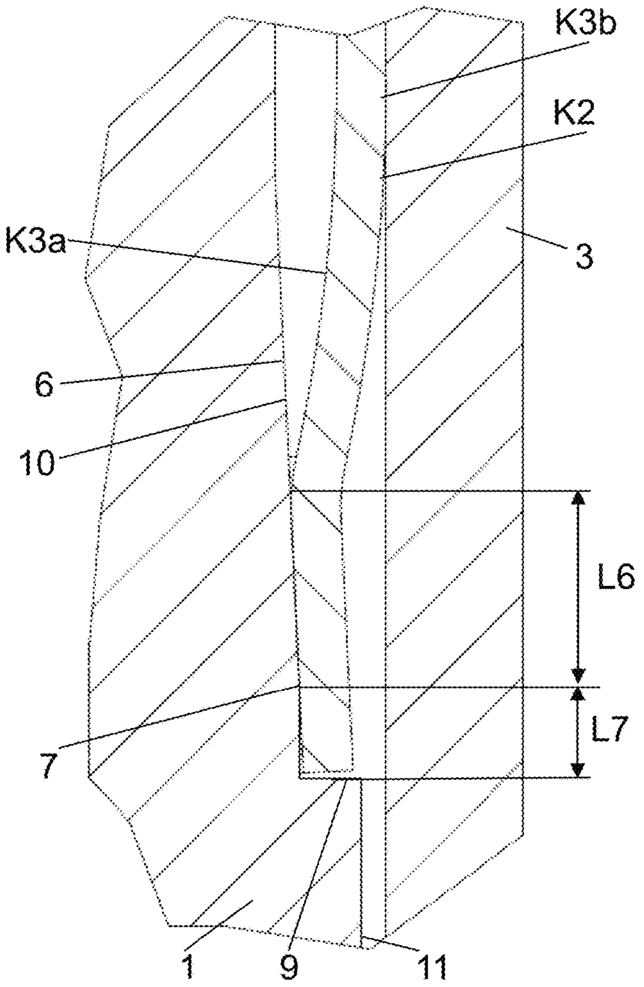
FIG. 6 shows a detailed view of detail b of FIG. 5.
Figure 7:
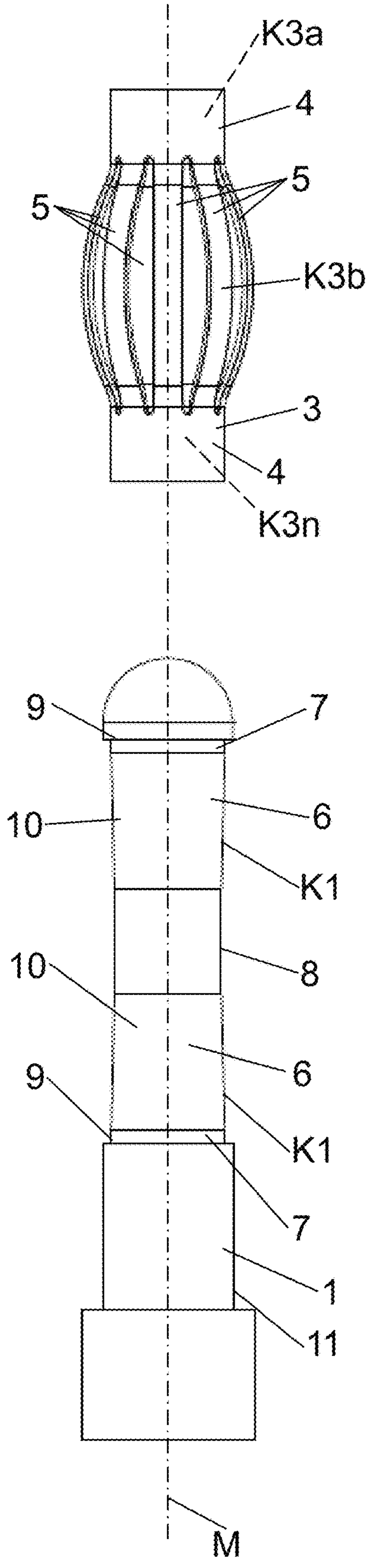
FIG. 7 shows a lateral exploded view of a plug pin of a plug-in connector assembly according to the invention, according to a second embodiment.
Figure 8:
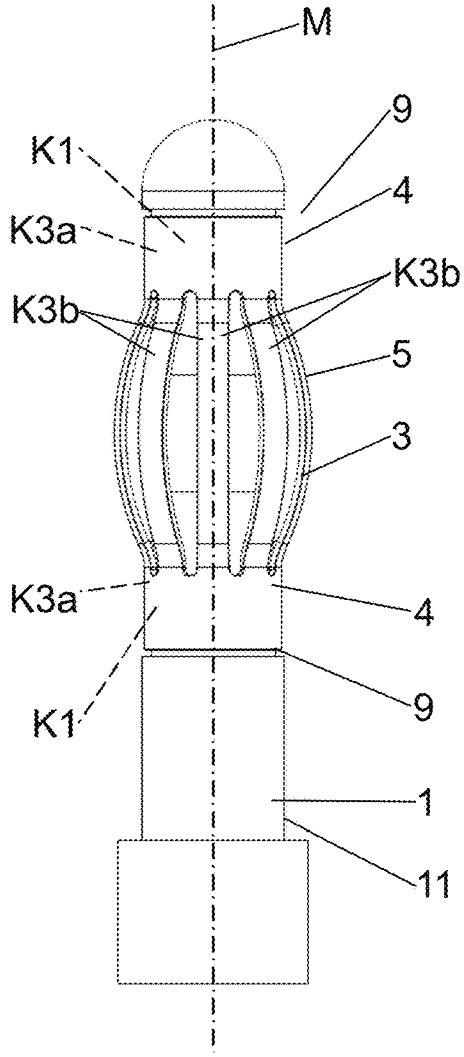
FIG. 8 shows the plug pin according to FIG. 7 in the connected state.
Figure 9:
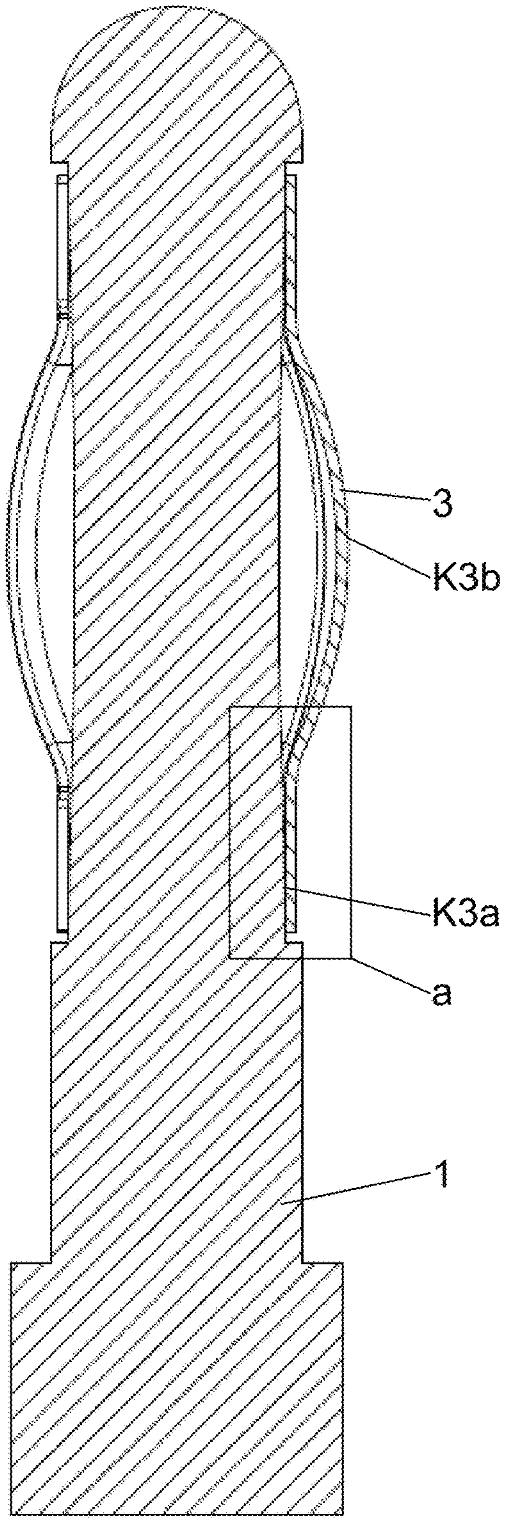
FIG. 9 shows a sectional view of FIG. 8.
Figure 12:
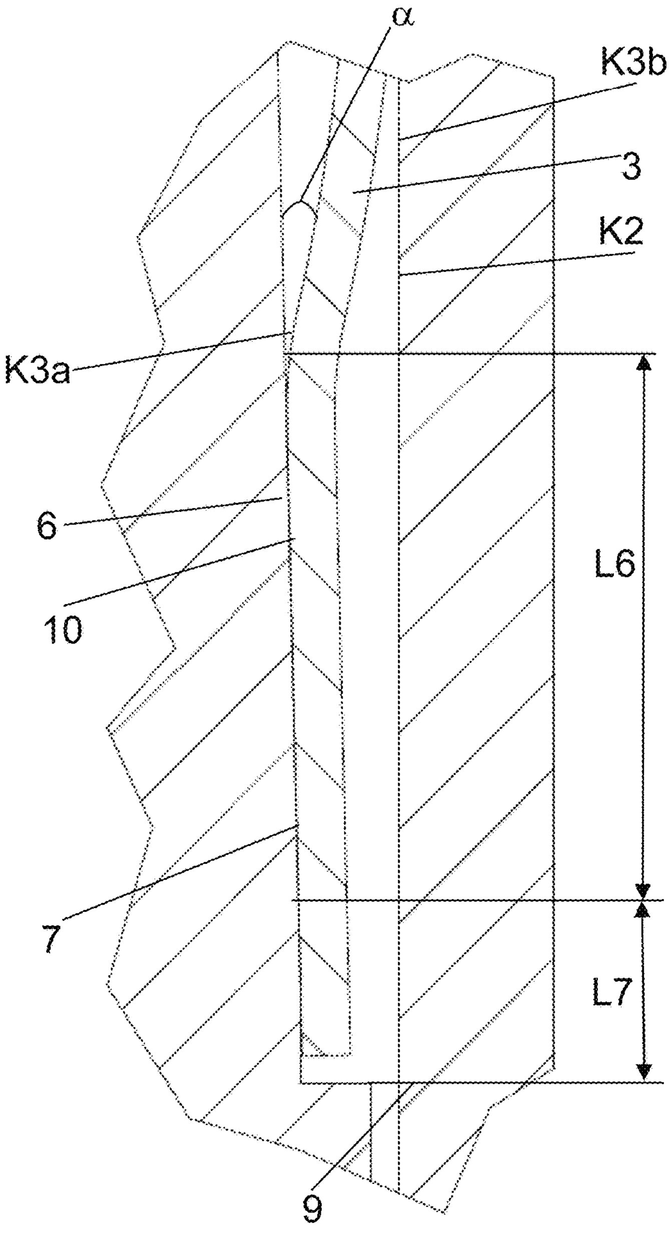
FIG. 12 shows a detailed view of detail d of FIG. 11.
Figure 13:
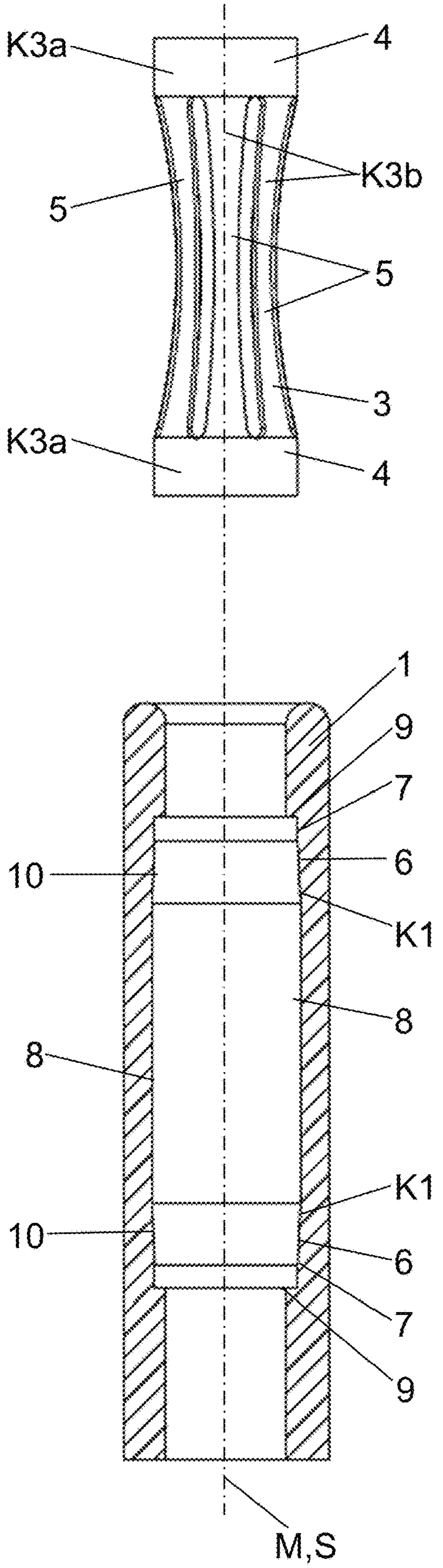
FIG. 13 shows a lateral exploded view of a plug pin of a plug-in connector assembly according to the invention according to a further embodiment.
Figure 14:
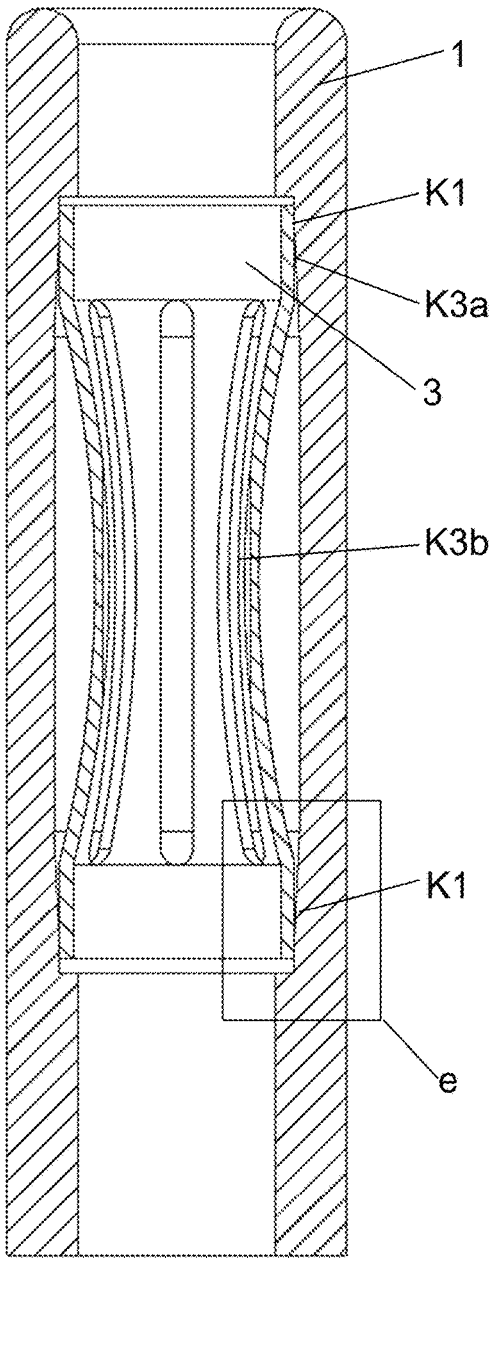
FIG. 14 shows the bushing according to FIG. 13 in the connected state.
Figure 17:
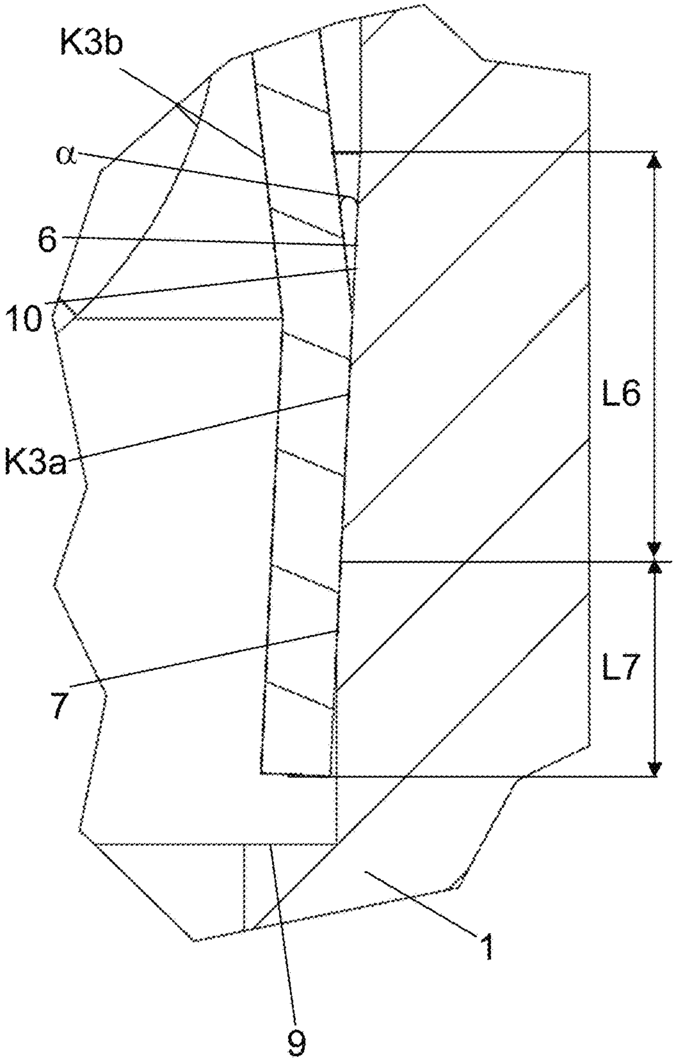
FIG. 17 shows a detailed view of detail f of FIG. 16.

In FIGS. 5, 6 and 16 or 11, 12 and 17, it can be clearly seen how the contact-strip-side contact face K3*a* and the first contact face K1 are in planar contact in said region 6. FIGS. 6, 12 and 17 show the details b, d and f of FIGS. 5, 11 and 16, respectively. In the detailed views, it can be clearly seen that in the plugged state the gap is eliminated and that the planar contact is created.

The angle α seen in cross-section through the center axis is between 0.5° and 5° in the unplugged state, in particular between 0.9° and 3°.

During the contact process, the contact tabs 5 deflect radially. In the embodiment shown, this is towards the center axis M. This also causes the at least one contact strip 4 to tilt radially. The tilting occurs in the elastic region of the contact strip 4. The contact-strip-side contact face K3*a* is moved towards the first contact face K1 by the tilting or deflection of the contact strip 4, and the planar contact between the contact-strip-side contact face K3*a* and the first contact face K1 is produced.

In the embodiment shown, said region 6, in which said contact faces K1, K3*a* run angularly inclined at the angle α relative to each other in the unplugged state forms a first region. This first region 6 is adjoined by a second region 7. In the second region 7, the contact-strip-side contact face K3*a* and the first contact face K1 are in planar contact with each other in the unplugged state.

In the plugged state, the contact-strip-side contact face K3*a* in the second region 7 is slightly raised from the first contact face K1. The planar contact is then held in said first region 6.

In the embodiment shown, the first region 6 is designed as a cone region 10. This means that the first region 6 is conical. The second region 7 is cylindrical. Further, the contact-strip-side contact face K3*a* is cylindrical. The above-mentioned angle α is provided by the cone region 10 and by the cylindrical contact face K3*a*. Alternatively, the contact face K3*a* could also be conical and the first region 6 could be cylindrical.

The length L6 of the first region 6, viewed in the direction of the center axis M, is many times greater than the length L7 of the second region 7. The sum of the length L6 of the first region 6 and the length L7 of the second region 7 is preferably greater than the length of the contact strip 4, viewed in the direction of the center axis M.

In the embodiment shown, the first plug-in connector element 1 has a receiving groove 8 for receiving the contact element 3. The receiving groove 8 is laterally bounded by two stop faces 9 that are spaced apart from each other. One stop face 9 is adjoined in the direction of the receiving groove 8 by a second region 7, which is then followed by a first region 6. Likewise, the other stop face 9 is adjoined by a second region 7 in the direction of the receiving groove 8, which is then adjoined by a first region 6. Seen from the stop face, the receiving groove 8 thus first runs cylindrically with the second region 7 and then conically with the first region 6. There is preferably axial play between the stop faces 9, which laterally delimit the receiving groove 8, and the contact element 3.

Between the first two regions 6, the receiving groove 8 has a tapered cross-section. The contact tabs 5 extend over this tapered region. This means that the receiving groove 8 has a smaller diameter in the region in which the contact tabs 5 are located than in the region in which the contact strip 4 is located.

The receiving groove 8 extends radially from a cylindrical outer face 11 into the first plug-in connector element 1.

In another embodiment shown in FIGS. 13 to 17, the first plug-in connector element 1 has the form of a socket element and the second plug-in connector element 2 has the form of a plug pin. The receiving groove 8 is placed here on the inside of the socket element and the contact element 3 is located in said receiving groove 8. The basic structure is identical here to the embodiments shown in FIGS. 1 to 12, wherein the contact element 3 is fixedly arranged in the socket element.

LIST OF REFERENCE SIGNS

1 first plug-in connector element
2 second plug-in connector element
3 contact element
4 contact strip
5 contact tabs
6 region
7 second region
8 receiving groove
9 stop face
10 cone region
11 cylindrical outer face
L6 length first region
L7 length second range
K1 first contact face
K2 second contact face
K3*a* contact-strip-side contact face
K3*b* contact-tab-side contact faces
M center axis
S plug-in axis
α angle

The invention claimed is:

1. A plug-in connector assembly comprising
a first plug-in connector element with at least one first contact face,
a second plug-in connector element with at least one second contact face,
and a contact element for establishing an electrical contact between the first plug-in connector element and the second plug-in connector element,
wherein the first plug-in connector element and the second plug-in connector element are connectable to each other in the direction of a plug-in axis from an unplugged state to a plugged state,
wherein the contact element has at least one contact strip extending around the center axis and having a contact-strip-side contact face, and a plurality of contact tabs extending away from the contact strip in the direction of the center axis and having contact-tab-side contact faces,
wherein the at least one contact strip can be brought into contact with the first contact face by means of the contact-strip-side contact face and the contact tabs can be brought into contact with the second contact face by means of the contact-tab-side contact faces, and
wherein the contact-strip-side contact face and the first contact face are formed in such a way:
wherein, in the unplugged state, the contact-strip-side contact face and the first contact face run angularly inclined at an angle relative to each other over a region seen in cross-section through the center axis,
wherein, in the plugged state, the contact-strip-side contact face and the first contact face can be brought into planar contact with each other in said region or in at least part of said region,
wherein said region, in which said contact faces run angularly inclined relative to each other in the unplugged state, forms a first region, wherein the first region is adjoined by a second region, in which the contact-strip-side contact face and the first contact face are in planar contact with each other in the unplugged state and
wherein, in the plugged state, the contact-strip-side contact face in the second region is raised from the first contact face.

2. The plug-in connector assembly as claimed in claim 1, wherein said region, in which said contact faces run angularly inclined relative to each other in the unplugged state, extends over the entire length of the contact strip or over part of the length of the contact strip, as seen in the direction of the center axis.

3. The plug-in connector assembly as claimed in claim 1,
wherein the first plug-in connector element has a receiving groove for receiving the contact element, wherein the receiving groove is delimited by two stop faces spaced apart from each other, and wherein said region, in which said contact faces run angularly inclined relative to each other in the unplugged state, is located in the region of the stop faces,
wherein the second region directly and immediately adjoins the stop face, and wherein the first region directly and immediately adjoins the second region.

4. The plug-in connector assembly as claimed in claim 1,
wherein said region, in which said contact faces run angularly inclined relative to each other in the unplugged state, extends over the entire length of the contact strip or over part of the length of the contact strip, as seen in the direction of the center axis,
wherein the first plug-in connector element has a receiving groove for receiving the contact element, wherein the receiving groove is delimited by two stop faces spaced apart from each other, and wherein said region, in which said contact faces run angularly inclined relative to each other in the unplugged state, is located in the region of the stop faces, and
wherein the first contact face directly and immediately adjoins one of the stop faces.

5. The plug-in connector assembly as claimed in claim 1, wherein in said region, in which said contact faces run angularly inclined relative to each other in the unplugged state, the contact-strip-side contact face is circular-cylindrical in the unplugged state and the first contact face has a cone region for providing the angular progression.

6. The plug-in connector assembly as claimed in claim 1, wherein in said region, in which said contact faces run angularly inclined relative to each other in the unplugged state, the first contact face is circular-cylindrical and the contact-strip-side contact face has a cone region in the unplugged state for providing the angular progression.

7. The plug-in connector assembly as claimed in claim 1, wherein, seen in cross-section through the center axis, said angle in the unplugged state is between 0.5° and 5°.

8. The plug-in connector assembly as claimed in claim 1, wherein the contact element has precisely two spaced-apart contact strips, wherein the contact tabs extend from one contact strip to the other contact strip.

9. The plug-in connector assembly as claimed in claim 1, wherein the contact tabs extend radially outwards or radially inwards with respect to the contact strip when viewed in cross-section transverse to the center axis.

10. The plug-in connector assembly as claimed in claim 1, wherein the second contact face is circular-cylindrical; or wherein the second contact face is circular-cylindrical with a constant diameter.

11. The plug-in connector assembly as claimed in claim 1, wherein the first plug-in connector element is a plug pin and wherein the second plug-in connector element is a socket; or wherein the first plug-in connector element is a socket and wherein the second plug-in connector element is a plug pin.

12. The plug-in connector assembly as claimed in claim 1, wherein, seen in cross-section through the center axis, said angle in the unplugged state is between 0.9° and 3°.

13. The plug-in connector assembly as claimed in claim 1, wherein the length of the first region, viewed in the direction of the center axis, is many times greater than the length of the second region.

14. The plug-in connector assembly as claimed in claim 13, wherein the first plug-in connector element has a receiving groove for receiving the contact element, wherein the receiving groove is delimited by two stop faces spaced apart from each other, and wherein said region, in which said contact faces run angularly inclined relative to each other in the unplugged state, is located in the region of the stop faces, wherein the second region directly and immediately adjoins one of the stop faces, and wherein the first region directly and immediately adjoins the second region.

15. The plug-in connector assembly as claimed in claim 1, wherein the first plug-in connector element has a receiving groove for receiving the contact element, wherein the receiving groove is delimited by two stop faces spaced apart from each other, and wherein said region, in which said contact faces run angularly inclined relative to each other in the unplugged state, is located in the region of the stop faces.

16. The plug-in connector assembly as claimed in claim 15, wherein the receiving groove has a smaller diameter in the region in which the contact tabs lie than in the region in which the contact strip lies.

* * * * *